United States Patent Office 3,291,463
Patented Dec. 13, 1966

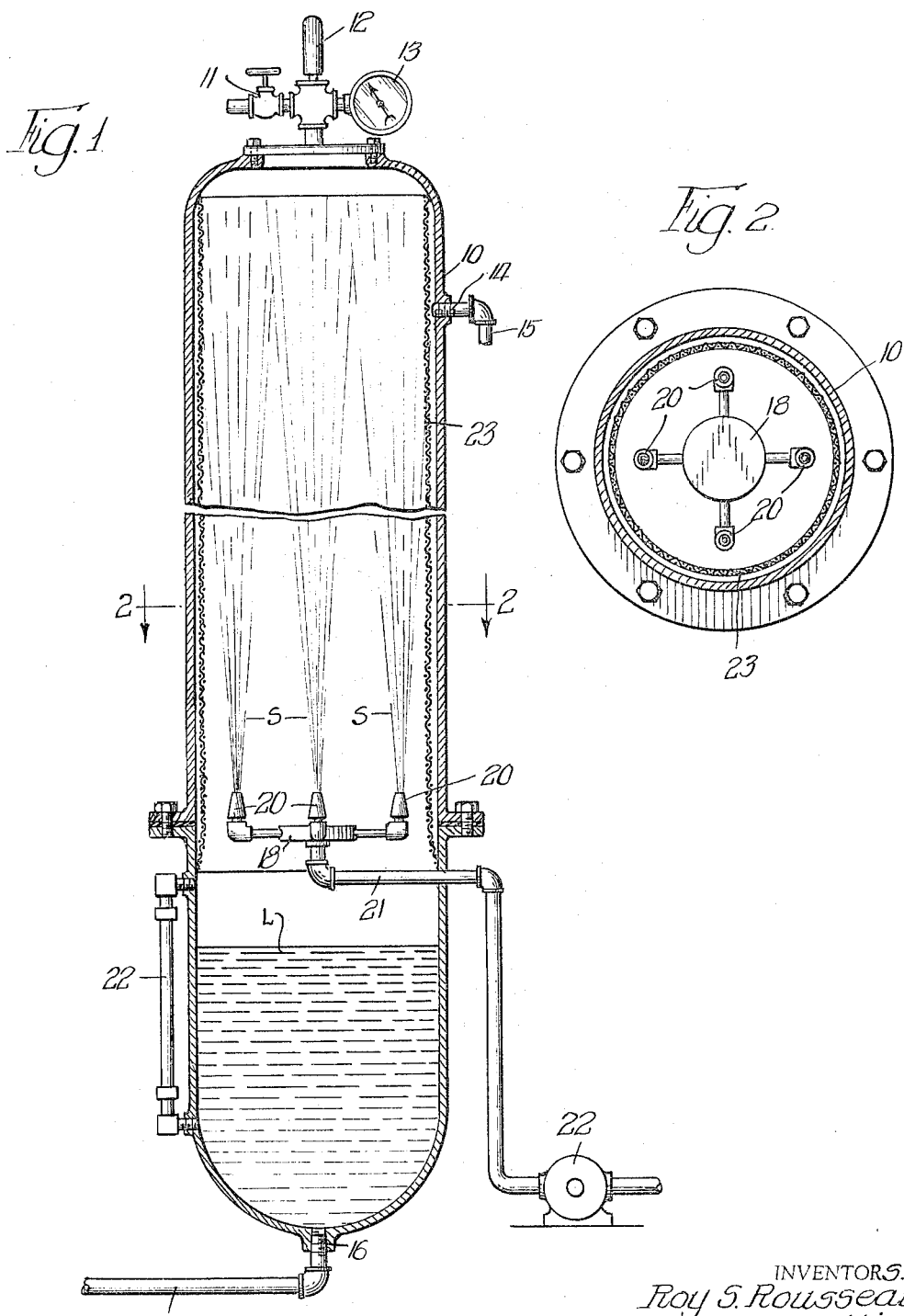
INVENTORS.
Roy S. Rousseau,
BY Robert L. Seiling,

3,291,463
APPARATUS FOR CHARGING A LIQUID
WITH A GAS
Roy S. Rousseau, Mount Prospect, Ill., and Robert L. Seiling, Madison, Wis., assignors to The Kartridg Pak Co., Davenport, Iowa, a corporation of Iowa
Filed Dec. 26, 1963, Ser. No. 333,599
3 Claims. (Cl. 261—100)

This invention relates to liquid treatment and is more particularly concerned with apparatus for charging a liquid with a gas so as to provide a practically complete saturation of the gas with the liquid.

Various methods have heretofore been proposed for mixing a liquid and a gas. In most cases, it has been proposed to introduce the gas into the liquid by means of shaking or by agitation and with temperature control and a set time allowed for absorption. Most often, the prior procedures have been limited to a batch operation and it has not been possible to provide a continuous supply of the charged liquid which is generally desirable. It is a general object, therefore, of the present invention to provide an improved apparatus for charging a liquid with a gas so as to insure that the maximum amount of gas is absorbed in the liquid and to permit the process to be carried out in a continuous manner, thereby providing a continuous supply of the charged liquid.

It is a further object of the invention to provide apparatus for charging a liquid with a gas wherein the liquid is exposed to the gas while it is in small particle form for a sufficient length of time to insure that the desired amount of gas will be absorbed in the liquid.

It is another object of the invention to provide an apparatus for charging a liquid with a compressed gas which comprises a vertically disposed container forming a chamber having a plurality of liquid discharging nozzles in the lower portion thereof with the nozzles directing a fine spray of the liquid towards the top of the chamber and with provisions for charging the upper portion of the chamber with the desired gas under pressure so that the liquid is exposed to the gas while it is in finely divided particles which are projected by the nozzle upwardly through the gas filled area in the chamber and then fall by gravity back down through the gas for collection at the bottom of the chamber from which the charged liquid may be continuously withdrawn.

It is still another object of the invention to provide an apparatus of the type described wherein a screen of relatively fine mesh is secured in slightly spaced relation to the vertical walls of the tank so that any liquid spray which spreads out sufficiently to otherwise strike the inside wall of the tank will hit the screen and descend on both sides of the screen so as to insure that at least two surfaces will result which are exposed to the gas atmosphere.

These and other objects and advantages of the invention will be apparent from a consideration of the apparatus which is illustrated in the accompanying drawings and described herewith.

FIGURE 1 is a vertical section through an apparatus which is adapted to carry out the herein disclosed invention, portions of the apparatus being broken away; and FIGURE 2 is a horizontal section taken on the line 2—2 of FIGURE 1.

Referring to the drawing, there is illustrated an apparatus which is adapted to carry out the herein disclosed invention in connection with the treatment of a liquid material so as to mix with it a propellant-forming gas which is suitable for charging aerosol cans. The liquid material may be a variety of substances which are suitable for dispensing from an aerosol-type container, as for example, freons, water based solutions, alcohols, chlorinated hydrocarbons, naptha, mineral spirits and petroleum solvents. The gas may be any gas which is suitable for use as an aerosol propellant, as for example, nitrous oxide, carbon dioxide and ethylene.

The apparatus comprises an elongate cylindrical container forming tank 10 which is supported in any suitable manner in an upright position. The tank 10 is closed at the top and provided with a vent valve 11, safety valve 12 and a pressure gauge 13. A suitable inlet connection 14 is provided in the upper portion of the tank 10 for a gas supply line 15. At the bottom of the tank an outlet connection 16 is provided for a conduit 17 leading to an aerosol container filling machine. At a predetermined distance above the bottom of the tank 10 a nozzle support 18 is provided on which a plurality of nozzles 20 are mounted and connected to a liquid supply line 21 which extends through the wall and outside of the tank 10 and which preferably includes a pump 22. The nozzles 20 are of the cone-type which will break up the liquid into a fine spray S and project the same towards the top of the tank 10 in a cone formation so that the spray S rises in the direction of the top of the tank and falls by gravity, in the form of a shower, down through the gaseous atmosphere in the upper portion of the tank. The charged liquid L is collected at the bottom of the tank. A sight gauge arrangement, indicated at 22, is provided near the bottom of the tank to permit the level of the charged liquid L which has accumulated in the bottom of the tank to be observed. Preferably, the upper portion of the tank in which the gas is confined is lined with a plastic screen indicated at 23. The screen 23 is secured in spaced relation to the walls of the tank so that any of the liquid spray which spreads out sufficiently to otherwise strike the inside wall of the tank will hit the screen 23 and descend on both sides of the screen. Due to the action of the screen the film normally expected will be broken up and at least two surfaces will result which are exposed to the gas atmosphere.

It will be observed that in using the apparatus the gas to be mixed with the liquid is fed into the chamber formed by the tank 10 under the desired pressure and the liquid which is to be charged with the gas is fed through the conduit 21 to the nozzles 20 so that the liquid is broken up into fine particles or drops for exposure to the gas as it rises above the nozzles.

The apparatus illustrated has been employed, for example, to mix a nitrous oxide gas with a liquid aerosol product which is basically water based. Nitrous oxide at 150 p.s.i. has been introduced continuously into a tank having an inside diameter of 8 inches and a height of 6 feet with four spray nozzles having a 15° full cone spray pattern and a $\frac{1}{16}$ inch orifice opening, the nozzles being located in upwardly directed relation in the bottom portion of the tank and the liquid being fed to the nozzles at a pump speed up to 5 gallons per minute. The gas charged liquid collected in the bottom of the tank is delivered continuously through a connecting conduit to an aerosol container filling machine resulting in filled and closed containers with a final gas pressure at equilibrium in the container of 103 p.s.i. The same results have been obtained with the apparatus operated under the same conditions for mixing nitrous oxide gas with an aerosol space spray which is basically mineral spirits.

The apparatus is not limited to the mixing of the particular liquids and gases referred to but it will be understood that the specified liquids and gases are given as examples and that other liquids and gases, which are capable of being mixed, may be successfully combined with the apparatus and following the procedure described.

We claim:

1. Apparatus for charging a liquid with a gas which comprises an upright cylindrical tank forming a chamber for receiving a gas under pressure, means for supplying a gas to the tank so as to provide a compressed gas atmosphere in the tank, a plurality of upwardly directed cone-type spray nozzles mounted within the tank near the bottom thereof, a liquid supply line connected to said nozzles whereby to direct a fine spray of the liquid toward the top of the tank so that it will travel upwardly through the gas and then fall downwardly to an accumulating area at the bottom of the tank, a screen of relatively fine mesh forming a lining for the upper portion of the tank which is spaced a small distance from the interior surface of the tank and which breaks up any liquid material which is directed onto the interior surface thereof, said means for supplying gas being positioned in the side of the tank and opening into the space between the inner surface of the tank and the screen, the area above the nozzles otherwise being free of any flow obstructing means, and an outlet for withdrawing the charged liquid continuously from the accumulating area at the bottom of the tank.

2. Apparatus for charging a liquid with a gas which comprises a tank forming a vertically extending chamber for receiving a gas under pressure and having a charged liquid accumulating area at the bottom thereof, means for supplying a gas to the upper portion of the tank so as to provide a compressed gas atmosphere in the tank, a nozzle mounted within the tank adjacent the bottom of the chamber and above the liquid accumulating area, a liquid supply line connected to said nozzle, said nozzle being constructed to direct a fine spray of the liquid toward the top of the tank so that it will travel upwardly and then fall freely downward through the gas atmosphere to the bottom of the tank, a single relatively fine mesh screen mounted within the upper portion of the tank and spaced a small distance from the inner side wall surfaces so as to form a lining for breaking up any liquid which would otherwise fall on and run down the side wall surfaces, the area above the nozzle which is encompassed by the screen being free of obstructions which would interfere substantially with the travel of the liquid spray, and an outlet for withdrawing the accumulated charged liquid from the bottom of the chamber.

3. Apparatus for charging a liquid with a gas which comprises an upright cylindrical tank forming a chamber for receiving a gas under pressure, means for supplying a gas including a supply conduit opening into the upper portion of the tank so as to provide a compressed gas atmosphere in the tank, means mounted within the tank near the bottom thereof for producing a liquid spray and for directing the spray upwardly within the tank, said spray producing means being spaced above the bottom of the tank a sufficient distance to provide a charged liquid accumulating area in the bottom of the tank and below the spray producing means, a liquid supply line connected to said spray producing means whereby a fine spray of the liquid is directed upwardly toward the top of the tank so that it travels upwardly through the gas and then falls freely downwardly through the same to said accumulating area at the bottom of the tank, a single screen of relatively fine mesh disposed in the upper portion of the tank and spaced a small distance from the interior side wall surface of the tank so as to form a lining which breaks up any liquid material which would otherwise fall onto the interior side wall surface, the area above the spray producing means being free of obstructions which would interfere substantially with the travel of the spray, and an outlet for withdrawing the charged liquid from the accumulating area at the bottom of the tank.

References Cited by the Examiner

UNITED STATES PATENTS

| 1,611,321 | 12/1926 | Schmidt. | |
| 2,081,029 | 5/1937 | Young | 261—117 |
| 2,235,357 | 3/1941 | Conklin | 261—115 X |
| 2,388,344 | 11/1945 | Sebald | 261—115 X |
| 2,470,652 | 5/1949 | Scofield | 261—100 X |
| 2,666,036 | 1/1954 | Schwencke | 261—115 X |
| 2,827,901 | 3/1958 | Jones | 261—115 X |

FOREIGN PATENTS 2,144   1902   Great Britain.

HARRY S. THORNTON, *Primary Examiner.*

RONALD R. WEAVER, *Examiner.*